United States Patent Office 2,763,597
Patented Sept. 18, 1956

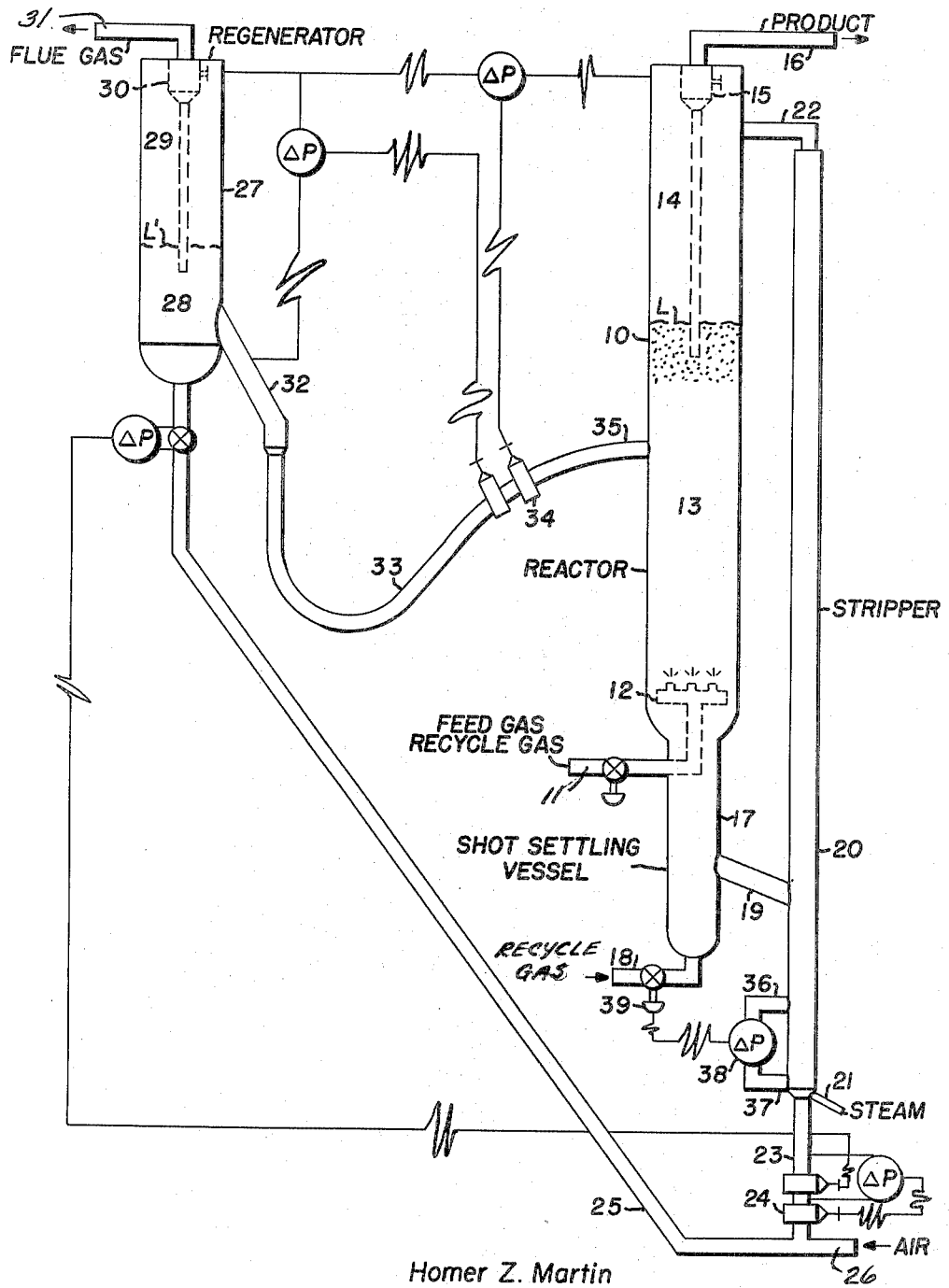

2,763,597

FLUID HYDROFORMING PROCESS

Homer Z. Martin, Cranford, N. J., and Lloyd A. Nicolai and Lawrence E. Swabb, Jr., Baton Rouge, La., assignors to Esso Research and Engineering Company, a corporation of Delaware Application January 4, 1954, Serial No. 402,038

9 Claims. (Cl. 196—50)

This invention pertains to the conduct of endothermic chemical reactions such as the distillation of shale and catalytic conversion of hydrocarbons, and more particularly to the catalytic reforming or hydroforming of hydrocarbon fractions boiling within the motor fuel or naphtha range of low knock rating into high octane number motor fuels rich in aromatics by the fluidized solids technique.

Hydroforming is a well known process for treating hydrocarbon fractions boiling within the motor fuel or naphtha range to upgrade or increase the aromaticity and improve the anti-knock and engine cleanliness characteristics of such fractions. By hydroforming is ordinarily meant a conversion process conducted at elevated temperatures and pressures in the presence of solid catalyst particles and hydrogen whereby the hydrocarbon fraction is increased in aromaticity and in which conversion there is no net consumption of hydrogen. Hydroforming is ordinarily carried out in the presence of hydrogen or a hydrogen-rich recycle gas (i. e. at relatively high hydrogen partial pressures) in the pressure range of from about 50–1000 lbs. per sq. in, at temperatures of about 750–1150° F. and in contact with such catalysts as molybdenum oxide, chromium oxide or, in general, oxides or sulfides of metals of groups IV–VIII of the periodic system of elements, alone, or generally dispersed or supported upon a base or spacing agent such as alumina gel, precipitated alumina, or zinc aluminate spinel.

It has been proposed to effect the hydroforming of naphtha fractions in a fluidized solids reactor system in which the naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled.

A further advantage of the foregoing fluidized solids technique has been the fact that the freshly regenerated catalyst can be utilized to carry part of the heat required for the hydroforming operation from the regeneration zone into the reaction zone. It has been proposed in this connection to discharge hot, freshly regenerated catalyst particles into a stream of hot, hydrogen-rich recycle gas in a transfer line whereby the catalyst particles are subjected to a reconditioning treatment during their passage through the transfer line into the reactor. This reconditioning or pretreatment of the regenerated catalyst particles involves at least a partial reduction of higher catalytic metal oxides formed during regeneration to a lower, more catalytically active form of catalytic metal oxide. In view of the high temperature of the regenerated catalyst (1050–1200° F.) and the exothermic character of the reduction or reaction between the regenerated catalyst and the hydrogen, it is necessary to make the transfer line very short and of small diameter in order to keep the time of contact of the freshly regenerated catalyst and hydrogen sufficiently short to avoid over-reduction and/or thermal degradation of the catalyst.

It has been proposed to alleviate this problem by mixing recycle reactor catalyst with the freshly regenerated catalyst to lower and control the temperature of pretreatment while simultaneously recovering the sensible heat of the regenerated catalyst as well as the heat released by the partial reduction of the catalytic metal oxides for use in the hydroforming reaction zone. Although this expedient permits recovery of a substantial amount of heat for use in the hydrocarbon conversion or hydroforming reaction, the total amount of heat that can be recovered and supplied to the reaction zone by the catalyst is limited by the low catalyst to oil ratios that must be maintained in hydroforming reactions because of selectivity considerations. In general, the catalyst to oil ratio must be less than about 3.5 and is usually about 1 because higher ratios give excessively high carbon formation and poor selectivity to desired motor fuel constituents. Since the amount of heat released in the regenerator is so great that the catalyst is incapable of transferring it to the reaction zone at the low catalyst to oil ratios without exceeding safe temperature levels, it is common practice to arrange cooling coils in the regenerator to remove heat generated over and above that which can be safely transferred to the reactor by the catalyst. It is therefore necessary to supplement the heat supplied by the catalyst and this is done by preheating the feed stock and recycle or hydrogen rich process gas to temperatures well above the average reactor temperature. This preheating has an adverse effect upon the yield of liquid products since it brings about thermal degradation of the feed as well as some of the higher molecular weight constituents of the recycle gas. Moreover, excessively large amounts of recycle gas must be introduced to carry heat into the reaction zone and the cost of this extra compressor and heat exchanger capacity adds very substantially to the total cost of the plant.

It is the object of this invention to provide the art with an improved method for carrying out chemical reactions by the fluidized solids technique.

It is also the object of this invention to provide the art with a simple, economical fluid hydroforming reactor system in which inert heat transfer solids are circulated between the reaction zone and the regeneration zone to transfer heat from the regeneration zone to the reaction zone.

It is a further object of this invention to provide the art with a simple, economical reactor system in which inert heat transfer solids are circulated between the reaction zone and the regeneration zone with a low ratio of inert heat transfer solids to catalyst in the reaction zone and a high ratio of inert heat transfer solids to catalyst in the transfer lines and regeneration zone.

These and other objects will appear more clearly from the detailed specification and claims which follow.

It has now been found that a heat-balanced hydroforming operation, i. e., an operation in which most of the heat released in the regeneration zone is transferred to and utilized in the reaction zone, can be carried out in a simple but highly effective manner by circulation of inert heat transfer solids through the regeneration and reaction zones. It is, of course, old to use so-called pebble heaters to heat up an extraneous, heat-carrying solid and circulate the same through the reaction zone in order to convey some or all the heat required for carrying out the desired reaction. In general, the previously proposed methods have involved either the circulation of the inert heat-carrying solids and catalyst particles as separate streams or the dilution of the catalyst by a certain amount of inert, heat transfer solids and circulating a catalyst-inert solids mixture of substantially constant composition between the reactor and regenerator vessels. The former systems are objectionable because they require the use of two or more circulating systems with separate, complicated controls while the latter are objectionable because of the fact that the inert heat transfer solids occupy valuable reactor space and therefore require the use of larger reactor vessels or a substantial reduction in the throughput or feed rate to the system.

In accordance with the present invention, a settling vessel is appended to the bottom of the reactor vessel which is charged with a mixture of finely divided catalyst and relatively coarse, dense, inert heat transfer solids. Recycle gas is supplied to the bottom of the settling vessel at a suitable rate to permit segregation or settling of heat transfer solids or shot into or through the settling vessel and thereby controlling the ratio of heat transfer solids to catalyst in the stream withdrawn from said settling vessel. The recycle gas supplied to the settling vessel passes upwardly therefrom through the reactor vessel where it performs its ordinary function of reducing or inhibiting carbon formation. In other words, the recycle gas performs a dual function in that it first serves as fluidizing or segregating gas in the settling vessel and then as the diluent or carbon inhibiting gas in the reactor vessel proper. In this way a mixture of heat transfer solids and catalyst in any desired ratio can be withdrawn from the reactor side of the system and without the use of an extraneous elutriating gas. The mixture of solids is transferred to the regenerator where carbonaceous deposits are burned, heating the catalyst particles and heat transfer solids for recirculation to the reactor. If desired, a similar settling vessel may be provided on the regenerator in the event that a long holdup of catalyst in the regenerator is desired while avoiding the increase in size of regenerator that would be required if the shot is held for the same period. Ordinarily such a settling vessel would not be necessary on the regenerator in a hydroforming reactor system because regeneration occurs very rapidly and the regenerator vessel is quite small.

Reference is made to the accompanying drawing illustrating a diagrammatic flow plan of a hydroforming reactor system in accordance with the present invention.

Referring to the drawing, the system comprises a reactor vessel 10 and a regenerator vessel 27 suitably connected to each other for continuous recirculation of solids. Feed stock or naphtha suitably preheated and if desired, hot recycle gas are supplied to reactor vessel 10 through inlet line 11 and distributor means 12 such as a distributor ring or spider arranged in the lower part of the reactor vessel which serves to distribute the incoming gases and vapors uniformly over the cross section of the vessel. Although the feed and the recycle gas are shown as entering the reactor together, it is also possible and in some cases it may be preferable to introduce the feed separately from the recycle gas. When supplied separately, the fresh feed is ordinarily introduced at a higher level in the reactor than the recycle gas. The reactor vessel 10 is charged with finely divided catalyst particles and inert heat transfer solids or shot which are maintained as a dense fluidized, liquid-simulating mass or bed 13 having a definite level L or interface separating the dense, fluidized bed 13 from a disperse or dilute phase 14 comprising small amounts of solid particles entrained in the vaporous reaction products. The reaction products pass overhead from the reactor dense bed 13 and are passed through a cyclone separator 15 or the like in order to free them of most of the solid particles that are entrained therewith. The separated catalyst particles are returned to the reactor dense bed through the dip leg attached to the bottom of the cyclone separator 15. Reaction products substantially free of catalyst or other solid particles are removed through product outlet line 16 to suitable product recovery, stabilizing and/or storage equipment.

Suitable catalysts for charging to the reactor vessel 10 are metal oxides such as molybdenum oxide, chromium oxide, tungsten oxide, vanadium oxide or the like or mixtures thereof upon a carrier such as activated alumina, zinc aluminate spinel or the like. Other hydroforming catalysts such as platinum or palladium upon alumina can also be used. The catalyst particles should, for proper fluidization, be between about 200 and 400 mesh in size or, about 10 to 200 microns in diameter with a major proportion between about 20 and 100 microns.

The inert, heat transfer solids or shot are preferably coarser and/or of greater density than the catalyst used in the process. Suitable materials for use as inert, heat transfer solids are corundum, mullite, fused alumina, fused silica or the like. It is necessary that the heat transfer solids have no adverse effects upon the catalytic reaction or hydroforming process and that they be stable or resistant to breakdown due to the temperature and mechanical action to which they are subjected in the process. The size of the heat transfer solids or shot is of considerable importance and must be determined by the properties of the catalyst bed and the desired operating conditions for the system. The heat transfer solids may vary from about 100 to about 800 and are preferably 300 to 500 microns in diameter and also are preferably in the shape of spherical or spheroidal particles. The inert heat transfer particles are of as large a diameter as may be used and still obtain proper fluidization in the transfer lines and in the regenerator.

The circulation of inert heat transfer solids is controlled principally by control of the inventory of inert heat transfer solids in the system. As indicated above, it is important to keep the ratio of inert heat transfer solids to catalyst in the reaction zone as low as possible in order that the size of the reactor vessel will not be increased unduly. In a hydroforming reactor system, the ratio of shot to catalyst within the reactor vessel should be at least about 1 to 5 and is preferably nearer 1 to 10 while the ratio of shot to catalyst withdrawn from the reactor and circulated to the regenerator and back to the reactor should be at least 1 to 1 and may be as high as about 6 to 1. Given the capacity or holdup of the reactor vessel, transfer lines and regenerator, it is possible to determine the total amount of catalyst and shot or heat transfer solids that must be charged to the system.

The catalyst particles are maintained as a dense, fluidized liquid-simulating mass or bed in vessel 10 by the passage of naphtha vapors and recycle gas therethrough at a carefully controlled rate. The vapor velocity should be sufficient to fluidize the catalyst particles but not sufficient to create overall turbulence or vaporous top to bottom mixing that would substantially interfere with the slippage of heat transfer solids or shot through the fluidized bed of catalyst. The superficial velocity of the gases and vapors through the vessel will vary somewhat with the pressure. At 200 lbs. per sq. inch, the superficial velocity will ordinarily be about 0.2 to about 1.5 ft. per second. At higher pressures the velocities will be lower and at lower pressures the velocities may be higher.

Catalyst and inert heat transfer solids move downwardly in vessel 10 past the distributor 12 into shot settling vessel 17 connected to the bottom of vessel 10. While the shot might be separated or concentrated within vessel 10 proper, it is ordinarily preferable to provide an extension at the bottom of the vessel since this not only permits of greater flexibility in the composition of the solids stream circulated without changing reactor conditions but it also avoids the loss of valuable reactor space to the inert heat transfer solids and it also avoids the danger of fresh feed first contacting heat transfer solids in the substantial absence of catalyst. The shot settling vessel 17 is substantially smaller in cross sectional area than the main reactor vessel 10. For example, the diameter of the extension or shot settling vessel 17 should be less than about one half the diameter of the main reactor vessel 10. An inlet line 18 is connected to the bottom of the extension or shot settling vessel 17 in order to supply recycle gas thereto. By limiting the cross sectional area of the shot settling vessel and introducing at most about 10% of the recycle gas supplied to the reactor vessel, it is possible to achieve the desired control of the ratio of inert solids to catalyst withdrawn from the settling vessel. The concentration of the shot or heat transfer solids effected by the settling vessel is roughly proportional to the ratio of the cross sectional area of the reactor proper to the cross sectional area of the shot settling vessel. A line 19 is provided for the withdrawal of a stream rich in inert heat transfer solids and poor in catalyst from the shot settling vessel.

The concentration of shot in the reactor 10 is determined by the shot circulation rate, the reactor diameter, the properties of the fluid catalyst bed and the properties of the shot. An increase in the shot concentration in the shot-catalyst mixture in the settler is attained by reducing the diameter of the settling vessel from that of the reactor and thus increasing weight or the mass velocity of the shot falling through the bed. The amount of shot which diffuses or back-mixes from the settling vessel back into the reactor vessel depends upon the fluidizing gas velocity through the settling vessel, an increase in velocity serving to increase the shot concentration at a given height above the settler.

The stream of solids rich in shot withdrawn from settling vessel 17 is discharged into stripper conduit 20. Steam or an inert gas is introduced through line 21 at the bottom of the stripper in order to drive off vaporizable materials before transfer of the solids to the regenerator where combustible materials are burned off. The stripping gas and stripped vapors or gases pass overhead from stripper 20 through line 22 into the dilute or disperse phase 14 in the upper part of reactor vessel 10 for admixture, and recovery with the vaporous reaction products.

The solids stream rich in shot is discharged from the bottom of stripper conduit 20 into a standpipe 23 whence the stream of solids is discharged into transfer line 25 at a rate controlled by slide valve 24 or the like. Carrier gas is supplied through inlet line 26 in order to convey the mixture of inert solids and catalyst through the transfer line 25 into regenerator 27. The carrier gas may be steam, flue gas, air or a mixture of these gases. If insufficient air to effect the regeneration of the catalyst is included in the carrier gas, additional air can be supplied directly to the regenerator 27. Since combustion occurs very rapidly due to the nature of the catalyst undergoing regeneration and the pressure maintained on the system, it is possible to effect regeneration in the transfer line 25 in which event the regenerator vessel 27 can be omitted. In this case the transfer line would merely discharge into a cyclone separator or the like to disengage the flue gas from the solid particles which are either discharged through a dip leg on the cyclone directly back into the reactor dense bed or collected in a storage hopper or the like for return to the reactor vessel.

In the regenerator vessel 27, the regeneration gases pass through the mixture of inert solids and catalyst at a rate sufficient to maintain a dense, fluidized, liquid-simulating bed 28 having a definite level $L^1$. Combustion gases pass overhead from dense bed 28 into dilute or disperse phase 29 and thence through cyclone separator 30 to outlet line 31 and thence through suitable pressure relief or control valve means to a waste gas stack or flue or to suitable scrubbing and storage equipment in the event that it is desired to use this gas as a carrier or stripping gas in the system.

The mixture of inert heat transfer solids or shot and catalyst is withdrawn directly from the dense bed 28 in the regenerator 27 through withdrawal line 32 and is then returned to the reactor through U-bend line 33, slide valve 34 and inlet line 35. Stripping gas may be supplied to withdrawal line 32 in order to remove combustion products or a separate stripping cell may be provided. Also, the regenerated catalyst may be given a brief treatment with hydrogen or hydrogen-rich recycle gas in the transfer line or before discharge into the reactor. In a preferred embodiment, the catalyst in admixture with the inert heat transfer solids is returned to the reactor without pretreatment or without contact with hydrogen or hydrogen-rich recycle gas. In this way reduction or partial reduction of the oxidized catalyst is effected in the reactor itself at reactor temperature which obviates the danger of overpretreatment or thermal degradation of the catalyst and in the presence of the total volume of reactant and diluent vapors which serves to minimize the effect of water formed as a result of the reaction of hydrogen with the catalytic metal oxide.

Various control means may be provided in the system some of which are indicated diagrammatically in the drawing. One control of particular importance is that for maintaining the desired ratio of shot to catalyst in the circulating stream. The fluid density of the shot-catalyst mixture is an excellent measure of the composition of the mixture. Since that density is little affected by the amount of stripping gas used to strip the stream of shot and catalyst in stripper 20, pressure taps 36 and 37 are spaced a known distance to measure the pressure drop. This pressure drop is utilized in control system 38 to operate valve 39 in recycle gas inlet line 18. By adjusting or varying the quantity of gas introduced via line 18 it is possible to regulate the ratio of shot to the catalyst that is withdrawn from the settling vessel. For example, a decrease in the density of the mixture indicating insufficient shot in the circulating stream can be used to partially close control valve 39 permitting the shot to settle through the settling vessel more rapidly, thereby increasing the amount of shot flowing into the withdrawal line. On the other hand, when the density of the mixture passing through the stripper into the withdrawal line 23 increases, the increased difference in pressure measured can be used to open up the recycle gas control valve thereby hindering the settling of shot through the settling vessel 17, thus in turn, reducing the amount of shot flowing into the withdrawal line 19.

The shot settling vessel may take various forms. For example, instead of being shaped and connected to the base of the reactor vessel as shown, the settling vessel may be in the form of a long, tapering cone or a series of progressively smaller cones. By making the settling zone as a cone or series of cones, there is less tendency to establish a high concentration gradient of shot at the juncture of the reactor and settling vessel with its accompanying high rate of diffusion of shot back into the reactor vessel.

The feed or charging stock to the reactor in a hydroforming operation may be a virgin naphtha, a cracked naphtha, a Fischer-Tropsch naphtha or the like having a boiling range of from about 125–450° F. or it may be a narrow boiling cut from within this range. The feed stock is preheated alone or in admixture with recycle gas to reaction temperature or to the maximum temperature possible while avoiding thermal degradation of the feed stock. Ordinarily, preheating of the feed stock is carried out at about 800–1000° F., preferably about 950° F. Hydrogen-rich gas or recycle process gas which contains 50 volume percent or more of hydrogen is preheated to temperatures of about 1000–1200° F. in suitable preheat coils. Recycle gas is circulated through the reaction zone at a rate of from about 500 to 8000 cu. ft. per barrel of naphtha feed.

The hydroforming reactor vessel is operated at about

900–950° F., and at pressures of about 50–1000 lbs. per sq. inch, preferably about 200 lbs. per sq. inch. In the case of molybdenum oxide on alumina catalysts, it is desirable to maintain a small water partial pressure (approximately 0.1 to about 3.0 mol per cent) in the reaction zone. This water partial pressure can be obtained from water in the feed and/or in the recycle gas and also due to the formation of water in the regeneration as well as the pretreatment or partial reduction of the regenerated catalyst. This small water partial pressure permits operation at somewhat higher temperatures without loss in selectivity than is possible in the same system but lacking this water partial pressure.

The regenerator is operated at essentially the same pressure as the hydroforming reactor vessel and at temperatures of about 1000–1200° F. or low enough to avoid any danger of thermally degrading the catalyst. The average residence time of the catalyst in the reactor is of the order of from about 1 to 4 hours and in the regenerator of from about 3 to 15 minutes. The average residence time of the heat transfer solids or shot in the reaction zone is of the order of from about 3 minutes to 20 minutes and in the regenerator it may be about 3 to 15 minutes, i. e. coextensive with the residence of the catalyst in the regenerator or it may have a shorter residence time as when gas velocities through the regenerator are low enough and the regenerator itself is designed for segregation of shot.

The weight ratio of catalyst to oil introduced into the reactor should ordinarily be about 0.5 to 3.5 although catalyst-to-oil ratios of 0.1 and less may be used with platinum catalysts. It is ordinarily preferable to operate at catalyst-to-oil ratios of about 1.0 since higher ratios tend to give higher or excessive carbon or coke formation. Somewhat higher ratios can be used at higher pressures.

Space velocities or the weight in pounds of feed charged per hour per pound of catalyst in the reactor depends upon the age or activity level of the catalyst, the character of the feed stock and the desired octane number of the product. Space velocity for a molybdic oxide on alumina gel catalyst may vary, for example, from about 1.5 w./hr./w. to about 0.15 w./hr./w.

The foregoing description contains a limited number of embodiments of the present invention. It will be understood, however, that this invention is not limited thereto since numerous variations are possible without departing from the scope of this invention.

What is claimed is:

1. A method of carrying out endothermic hydrocarbon conversion reactions which comprises contacting vaporous reactants with a mixture of a major proportion of finely divided solid catalyst particles and a minor proportion of inert, heat-transfer solid particles of greater density and larger average particle size than said catalyst particles in a main reaction zone, controlling the vapor velocities through said mixtures in order to form a dense fluidized bed of catalyst particles in said main reaction zone without substantially interfering with the passage of the inert heat transfer solid particles downwardly through the fluidized bed, discharging a mixture of inert heat transfer solids and catalyst from the bottom of said dense fluidized bed into a settling zone of smaller cross sectional area than and arranged directly beneath said main reaction zone, introducing gas at the lower portion of said settling zone at a rate below the minimum fluidizing velocity of the inert heat transfer solid particles, discharging gas overhead from said settling zone into the bottom of the dense fluidized bed in said main reaction zone, withdrawing a stream of solid particles comprising a major proportion of inert heat transfer solids and a minor proportion of catalyst from said settling zone, treating the withdrawn solids with oxygen-containing gas to burn carbonaceous deposits therefrom and heat the heat transfer solids and catalyst and recycling the hot mixture to the upper part of the dense fluidized bed in the main reaction zone.

2. A method of carrying out endothermic hydrocarbon conversion reactions which comprises contacting vaporous reactants with a mixture of a major proportion of finely divided solid catalyst particles and a minor proportion of inert, heat transfer solid particles of greater density and larger average particle size than said catalyst particles in a main reaction zone, controlling the vapor velocities through said mixtures in order to form a dense fluidized bed of catalyst particles in said main reaction zone without substantially interfering with the passage of the inert heat transfer solid particles downwardly through the fluidized bed, discharging a mixture of inert heat transfer solids and catalyst from the bottom of said dense fluidized bed into a settling zone of smaller cross sectional area than and arranged directly beneath said main reaction zone, introducing gas at the lower portion of said settling zone at a rate below the minimum fluidizing velocity of the inert heat transfer solid particles, discharging gas overhead from said settling zone into the bottom of the dense fluidized bed in said main reaction zone, withdrawing a stream of solid particles comprising a major proportion of inert heat transfer solids and a minor proportion of catalyst from said settling zone, measuring the density of the withdrawn stream, controlling the introduction of gas into the lower portion of the settling zone in accordance with the measured density of the withdrawn stream, treating the withdrawn solids with oxygen-containing gas to burn carbonaceous deposits therefrom and heat the heat transfer solids and catalyst and recycling the hot mixture to the upper part of the dense fluidized bed in the main reaction zone.

3. A method of hydroforming hydrocarbon fractions boiling within the motor fuel or naphtha range which comprises contacting hydrocarbon vapors and hydrogen-rich recycle gas with a mixture of a major proportion of finely divided solid hydroforming catalyst particles and a minor proportion of inert, heat transfer solid particles of greater density and larger average particle size than said hydroforming catalyst particles at hydroforming conditions of temperature and pressure in a main reaction zone, controlling the vapor velocities through said mixture in order to form a dense, fluidized bed of catalyst particles in said main reaction zone without substantially interfering with the passage or slippage of the inert heat transfer solid particles downwardly through the fluidized bed, discharging a mixture of inert heat transfer solids and hydroforming catalyst particles from the bottom of said dense, fluidized bed into a settling zone of smaller cross-sectional area than and arranged directly beneath said main reaction zone, introducing hydrogen-rich recycle gas at the lower part of said settling zone at a rate below the minimum fluidizing velocity of the inert heat transfer solid particles, discharging said recycle gas overhead from said settling zone into the bottom of the dense fluidized bed in said main reaction zone, withdrawing a stream of solid particles comprising a major proportion of inert heat transfer solids and a minor proportion of hydroforming catalyst particles from said settling zone, treating the withdrawn solids with an oxygen-containing gas to burn carbonaceous deposits therefrom and heat the heat transfer solids and catalyst and recycling the hot solids to the upper part of the dense, fluidized bed in the main reaction zone.

4. A method of hydroforming hydrocarbon fractions boiling within the motor fuel or naphtha range which comprises contacting hydrocarbon vapors and hydrogen-rich recycle gas with a mixture of a major proportion of finely divided solid hydroforming catalyst particles and a minor proportion of inert, heat transfer solid particles of greater density and larger average particle size than said hydroforming catalyst particles at hydroforming conditions of temperature and pressure in a main reaction zone, controlling the vapor velocities through said mixture in order to form a dense, fluidized bed of catalyst particles in said main reaction zone without substantially interfering with the passage or slippage of the inert heat transfer solid articles downwardly through the fluidized bed, discharging a mixture of inert heat transfer solids and hydroforming catalyst particles from the bottom of said dense, fluidized bed into a settling zone of smaller cross-sectional area than and arranged directly beneath said main reaction zone, introducing hydrogen-rich recycle gas at the lower part of said settling zone at a rate below the minimum fluidizing velocity of the inert heat transfer solid particles, discharging said recycle gas overhead from said settling zone into the bottom of the dense fluidized bed in said main reaction zone, withdrawing a stream of solid particles comprising a major proportion of inert heat transfer solids and a minor proportion of hydroforming catalyst particles from said settling zone, measuring the density of the withdrawn stream, controlling the introduction of recycle gas into the lower portion of the settling zone in accordance with the measured density of the withrawn stream, treating the withdrawn solids with an oxygen-containing gas to burn carbonaceous deposits therefrom and heat the heat transfer solids and catalyst and recycling the hot solids to the upper part of the dense, fluidized bed in the main reaction zone.

5. The process as defined in claim 3 in which the catalyst is a Group VI metal oxide dispersed upon an alumina-containing support.

6. The process as defined in claim 3 in which the catalyst is molybdic oxide dispersed upon an alumina-containing support.

7. The process as defined in claim 3 in which the catalyst is a Group VI metal oxide dispersed upon an alumina-containing support and the mixture of hot heat transfer solids and catalyst is recycled to the reactor without contact with hydrogen containing materials prior to introduction into the dense, fluidized bed in the reaction zone.

8. The process as defined in claim 3 in which the catalyst is molybdic oxide dispersed upon an alumina-containing support and the mixture of hot heat transfer solids and catalyst is recycled to the reactor without contact with hydrogen containing materials prior to introduction into the dense, fluidized bed in the reaction zone.

9. The process as defined in claim 3 in which the catalyst is a platinum metal dispersed upon an alumina-containing support.

References Cited in the file of this patent
UNITED STATES PATENTS

| | | |
|---|---|---|
| 2,271,148 | Becker et al. | Jan. 27, 1942 |
| 2,393,636 | Johnson | Jan. 29, 1946 |
| 2,446,247 | Scheineman | Aug. 3, 1948 |
| 2,483,485 | Barr | Oct. 4, 1949 |
| 2,663,676 | Cardwell et al. | Dec. 22, 1953 |